(12) United States Patent
Gutierrez et al.

(10) Patent No.: US 11,864,067 B2
(45) Date of Patent: Jan. 2, 2024

(54) SYSTEMS AND METHODS FOR SENDING AND RECEIVING MESSAGES AS REMINDERS

(71) Applicant: Verizon Patent and Licensing Inc., Basking Ridge, NJ (US)

(72) Inventors: Kim M. Gutierrez, Alameda, CA (US); Yu Liang Wang, Fremont, CA (US); Manian Krishnamoorthy, Derry, NH (US); Steve M. Bellai, Basking Ridge, NJ (US); Adam Schwenk, Concord, CA (US); Praveen Atreya, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 17/247,277

(22) Filed: Dec. 7, 2020

(65) Prior Publication Data
US 2022/0182797 A1   Jun. 9, 2022

(51) Int. Cl.
  *H04W 4/12*   (2009.01)
  *G06F 3/04842*   (2022.01)
  *H04L 51/42*   (2022.01)

(52) U.S. Cl.
  CPC .......... *H04W 4/12* (2013.01); *G06F 3/04842* (2013.01); *H04L 51/42* (2022.05)

(58) Field of Classification Search
  None
  See application file for complete search history.

(56) References Cited

U.S. PATENT DOCUMENTS

| | | | |
|---|---|---|---|
| 9,554,050 B2* | 1/2017 | Dave | H04N 23/64 |
| 9,787,822 B1* | 10/2017 | Holland | H04M 1/72436 |
| 2002/0024540 A1* | 2/2002 | McCarthy | H04M 1/72451 |
| | | | 715/844 |
| 2006/0190966 A1* | 8/2006 | McKissick | H04N 7/147 |
| | | | 348/E7.071 |
| 2007/0229517 A1* | 10/2007 | May | G06Q 10/109 |
| | | | 345/501 |
| 2009/0106365 A1* | 4/2009 | Drory | H04L 51/34 |
| | | | 709/206 |
| 2010/0026526 A1* | 2/2010 | Yokota | G08G 1/096883 |
| | | | 340/996 |
| 2012/0296865 A1* | 11/2012 | Lin | G06F 40/242 |
| | | | 707/E17.005 |
| 2013/0110940 A1* | 5/2013 | Pasquero | H04M 1/72451 |
| | | | 709/206 |
| 2014/0324426 A1* | 10/2014 | Lu | G10L 15/08 |
| | | | 704/256.1 |
| 2016/0240213 A1* | 8/2016 | Wen | G10L 25/63 |

* cited by examiner

*Primary Examiner* — Tuan S Nguyen

(57) ABSTRACT

In some implementations, a user device may receive a text message and identify a keyword that relates to a future event. The user device may display, based on identifying the keyword, a first user interface that includes the text message and an option to set a reminder. The user device may receive a selection of the option and display a second user interface. The user device may receive a selection of a reminder type and automatically populate the reminder with text of the text message based on the selection of the reminder type. The user device may store the reminder and cause an action to be performed based on the reminder.

20 Claims, 10 Drawing Sheets

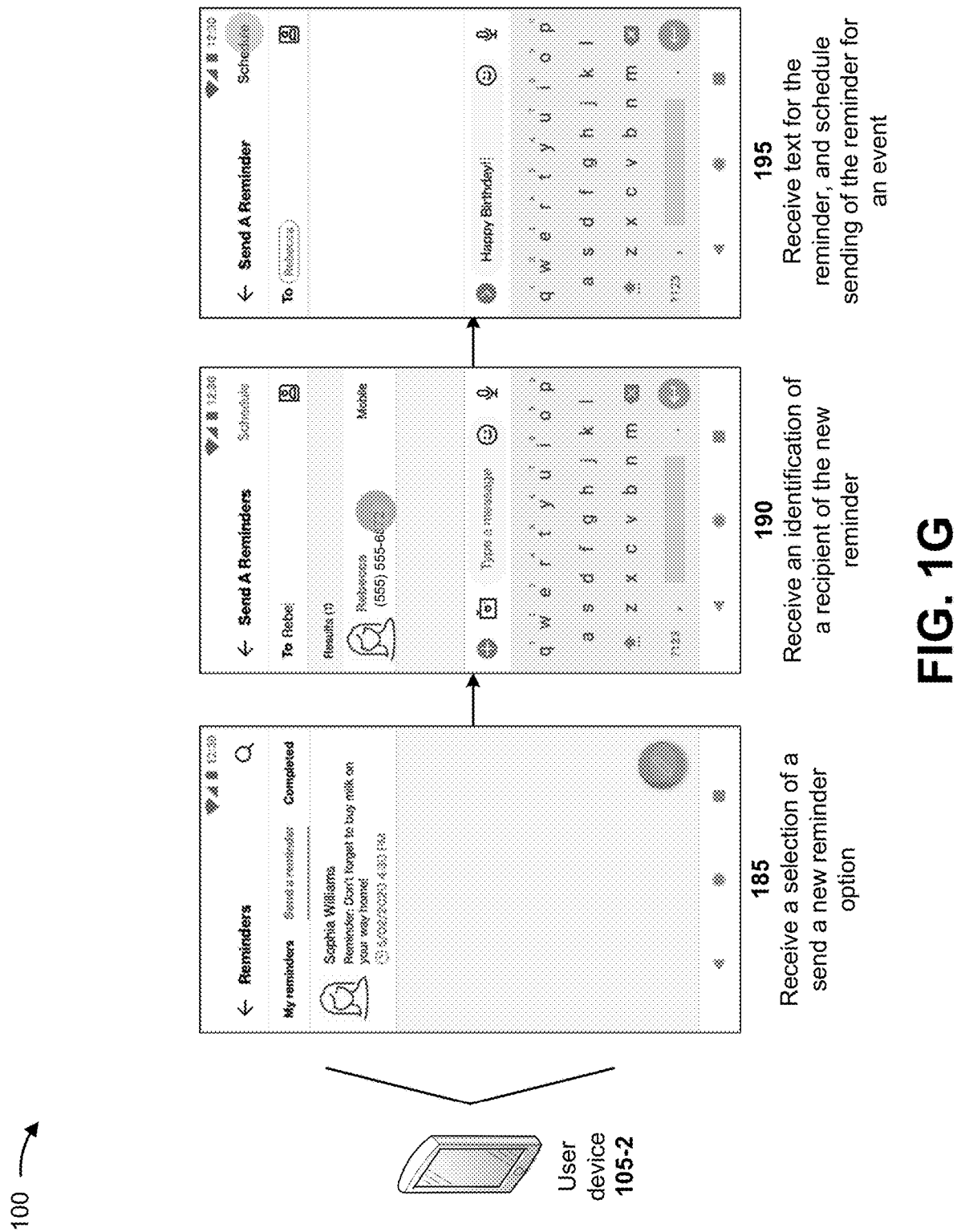

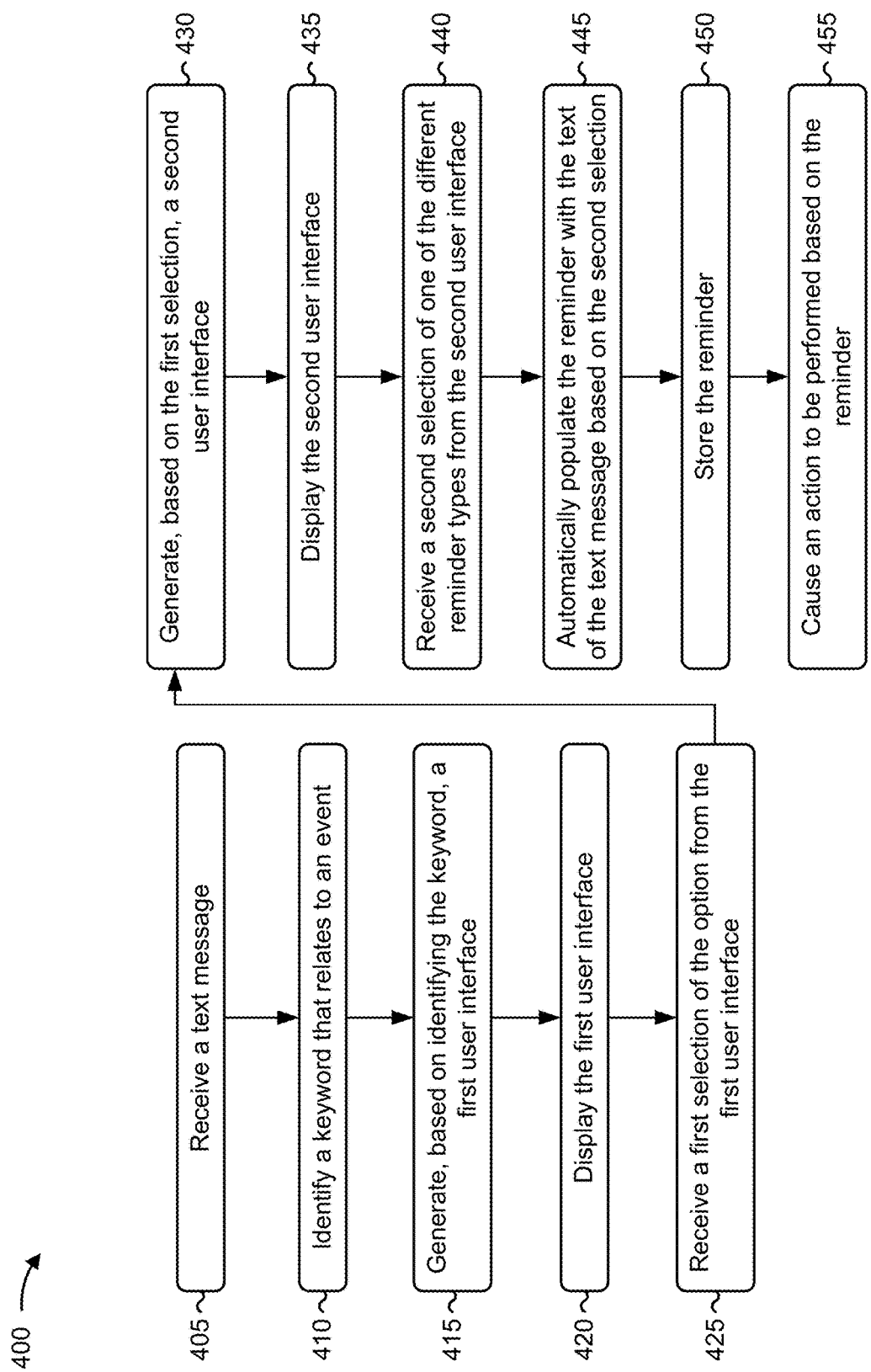

SYSTEMS AND METHODS FOR SENDING AND RECEIVING MESSAGES AS REMINDERS

BACKGROUND

Text messages, such as short message service (SMS) messages and multimedia message service (MMS) messages, are used for interpersonal communication and communication with automated systems. Text messages on user devices may include text, images, videos, audio content, and/or emojis. Text messages can be used for personal, organizational, or business purposes.

BRIEF DESCRIPTION OF THE DRAWINGS

FIGS. 1A-1G are diagrams of an example associated with sending and receiving a text message to be saved as a reminder.

FIG. 4 is a flowchart of an example process relating to sending and receiving a text message to be saved as a reminder.

DETAILED DESCRIPTION OF PREFERRED EMBODIMENTS

The following detailed description of example implementations refers to the accompanying drawings. The same reference numbers in different drawings may identify the same or similar elements.

User devices may be used to send and receive messages. Text messages may present a reason for a user to be reminded of a later event. However, in the midst of a text message conversation, it may be difficult for the user to remember, track, and act on a reminder that may relate to an event scheduled to happen in the future. While reminder applications may be used to set and receive reminders, they operate separately from text message conversations. For example, if a first user sends a text message to a second user stating, "call me at 4 PM," the second user may need to open a reminder application or a calendar application and set up a reminder to call the first user at 4 pm. This can be inconvenient for the second user.

In some implementations described herein, a user device may enable a user to send or receive a text message that can be saved as a reminder without having to access or launch a separate application. The reminder may notify the user at an appropriate time, and the user device may enable the user to perform one or more actions based on the reminder. For example, returning to the prior example, the first user may use the text message to automatically create the reminder, without leaving the text message conversation and executing a separate reminder application or calendar application.

FIGS. 1A-1G are diagrams of an example 100 associated with sending or receiving a text message that can be saved as a reminder. As shown in FIGS. 1A-1G, example 100 includes a user device 105-1 that transmits a text message, user device 105-2 that receives the text message, and a messenger device 110 that relays the text message as part of a service provider and/or application service. The user devices 105-1 and 105-2 may be a mobile phone, a smartphone, a tablet, a laptop, and/or a wearable device.

Figure 1A:
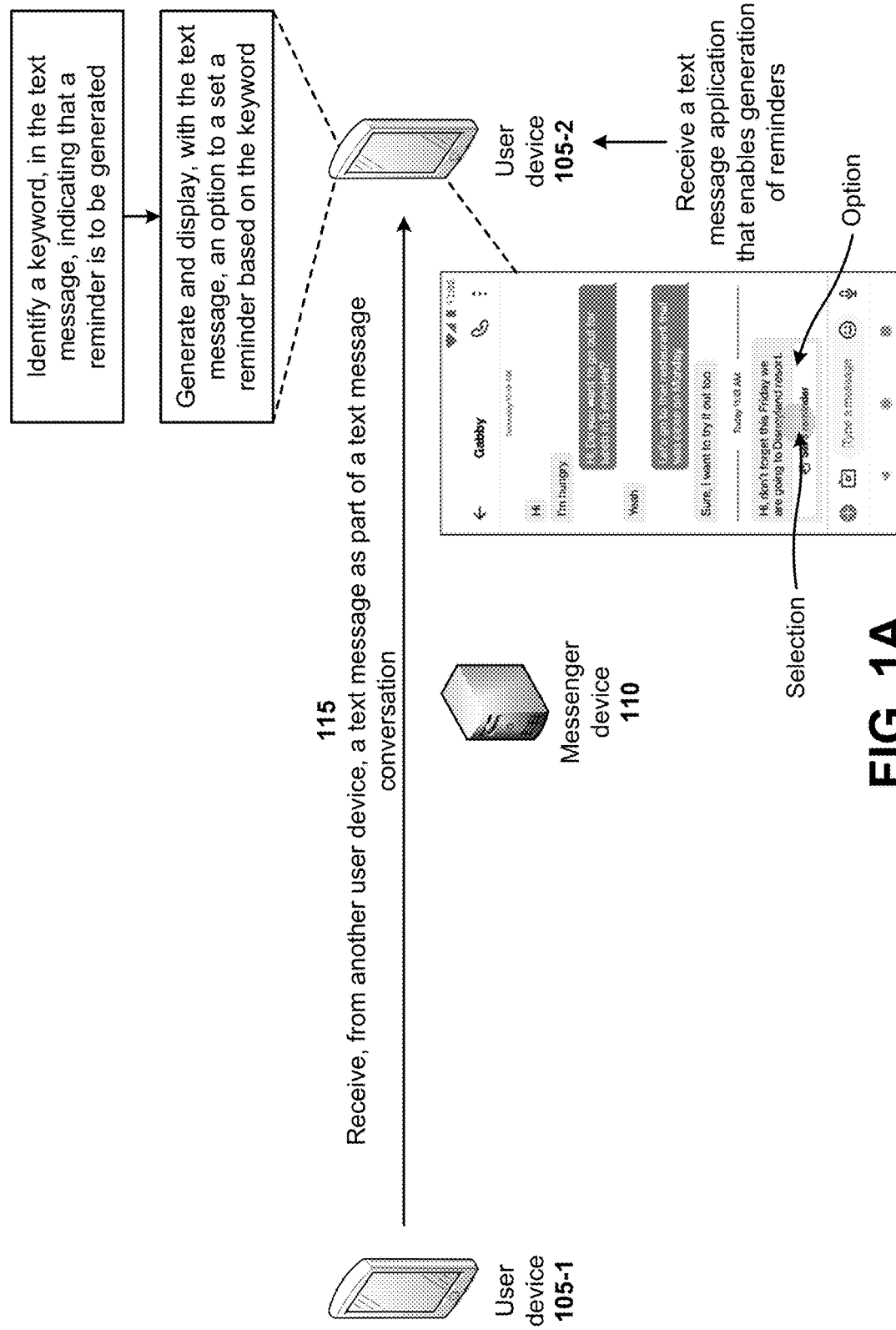

The user device 105-2 may be configured with an application or service that enables a user to send or receive a text message and to save a text message as a reminder. As shown by FIG. 1A, and by reference number 115, the user device 105-2 may receive the text message sent from the user device 105-1. The user device 105-2 may identify a keyword, in the text message, indicating that a reminder is to be generated. In some implementations, the user device 105-2 may identify the keyword from stored keyword information (e.g., lookup table) associated with potential reminder opportunities or events.

In some implementation, the user device 105-2 may determine a potential reminder opportunity from a text message based on machine learning. For example, the user device 105-2 may store words from past text messages that led to the setting of a reminder, the setting of an appointment, and/or the opening of a calendar application. By analyzing a history of words that led to reminder actions, the user device 105-2 may develop keyword information for triggering reminder prompts from text messages. Accordingly, the user device 105-2 may analyze a received text message, based on the history of words that led to reminder actions, to determine an intent of a text message. If the determined intent of the text message matches a reminder pattern, the user device 105-2 may display a prompt from the text message to set a reminder. In some implementations, the user device 105-2 may learn to remove a keyword if no action is taken related to the keyword for a number of instances (e.g., 10). Therefore, if the keyword appears in another text message, no reminder prompt may be displayed.

In some implementations, the keyword may, for example, involve an event. The event may be an ongoing event or a future event. The user device 105-2 may determine the event from a calendar, a search history, a message history, or other information. The user device 105-2 may associate the keyword with the event. The user device 105-2 may learn, based on actions taken in response to text messages with a keyword, that the keyword relates to an event.

The user device 105-2 may generate and display, with the text message, an option (e.g., suggestion or prompt) to set a reminder based on the keyword. FIG. 1A shows an example user interface that is displayed for the user device 105-2. In the user interface, the most recent text message includes the option, and the user device 105-2 may receive a selection to proceed with setting a reminder. There is no need for the user to leave the text message conversation or to lose sight of the text message while switching to another application to create the reminder.

Figure 1B:
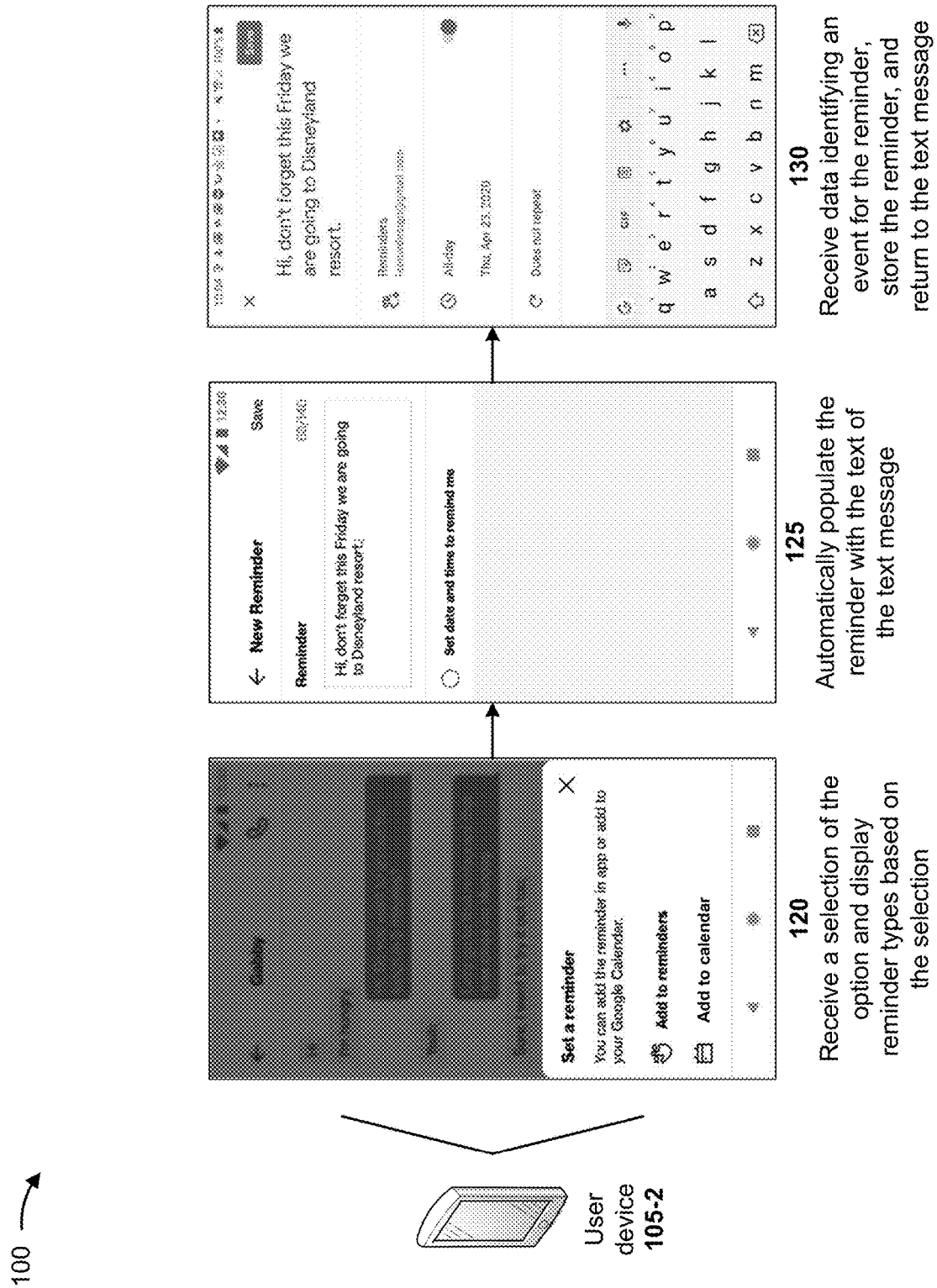

The example in FIG. 1A continues to FIG. 1B. As shown by reference number 120, the user device 105-2 may receive a selection of the option and display reminder types based on the selection. For example, the reminder type may be for a reminder application or for a calendar application. If the user device 105-2 receives a selection for the reminder application, the reminder application may open and automatically populate with text that is based on the text message, as shown by reference number 125. The populated text may be a copy of the text from the text message or text modified to be in reminder language. The user device 105-2 may populate the reminder with other information, such as a name or contact information for who sent the text.

As shown by reference number 130, the user device 105-2 may receive data identifying an event for the reminder. The data may be received from user entries, or automatically populated based on dates or times identified in the text message. The user device 105-2 may store the reminder and return to the text message or text message conversation. In other words, the user device 105-2 may enable a reminder to be set from a text message with, for example, three screen taps and without losing track of the text message.

Figure 1C:
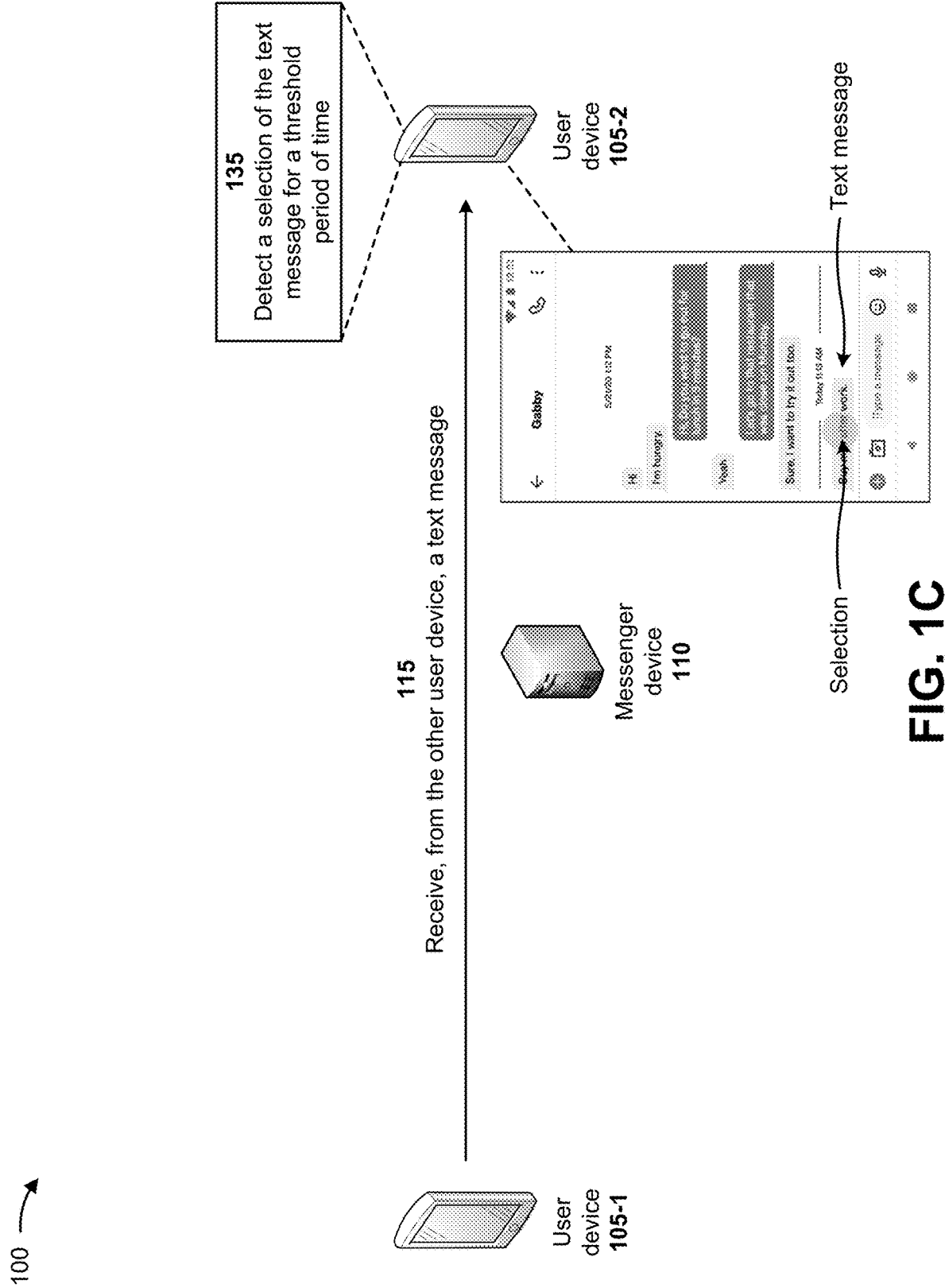

In some implementations, the user device 105-2 may utilize other methods for receiving a selection to set a reminder from a text message. As shown by FIG. 1C, and by reference number 115, the user device 105-2 may receive the text message from user device 105-1. As shown by reference number 135, the user device 105-2 may detect a selection of the text message for a threshold period of time (e.g., longer than what would be interpreted as a tap). For example, the user device 105-2 may detect that the user is pressing and holding on the text message.

Figure 1D:
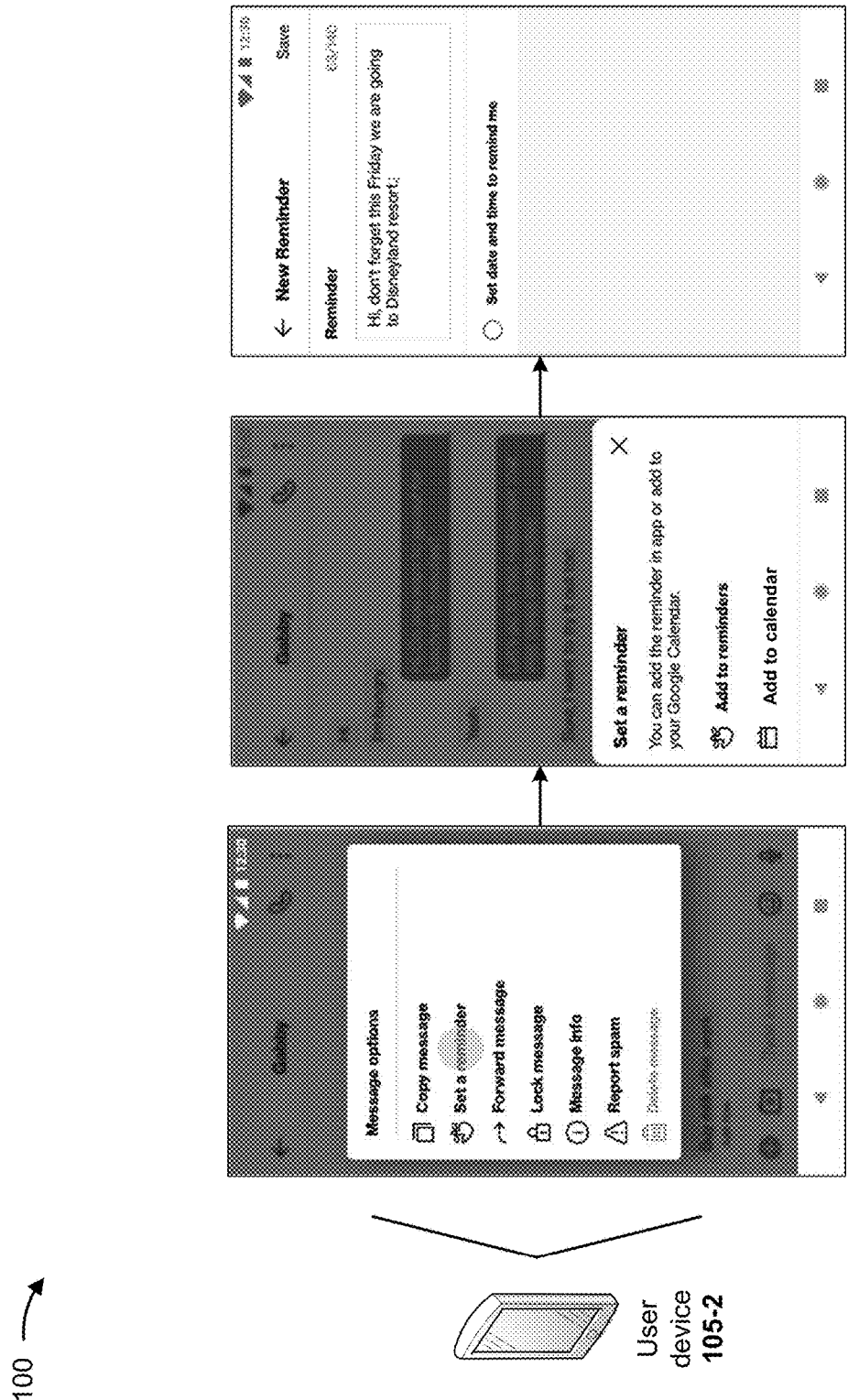

The example in FIG. 1C continues to FIG. 1D. As shown by reference number 140, the user device 105-2 may display message options based on detecting the selection of the text message for the threshold period of time. The options may include, for example, copying a message, forwarding a message, or deleting a message. One of the options may be to set a reminder. As shown by reference number 145, the user device 105-2 may receive a selection of an option to set a reminder and may display reminder types. As shown by reference number 150, the user device 105-2 may automatically populate the reminder with text from the text message and then store the reminder for an event. The event may be a particular action, a calendar item, a time, a place, and/or the like.

Figure 1E:
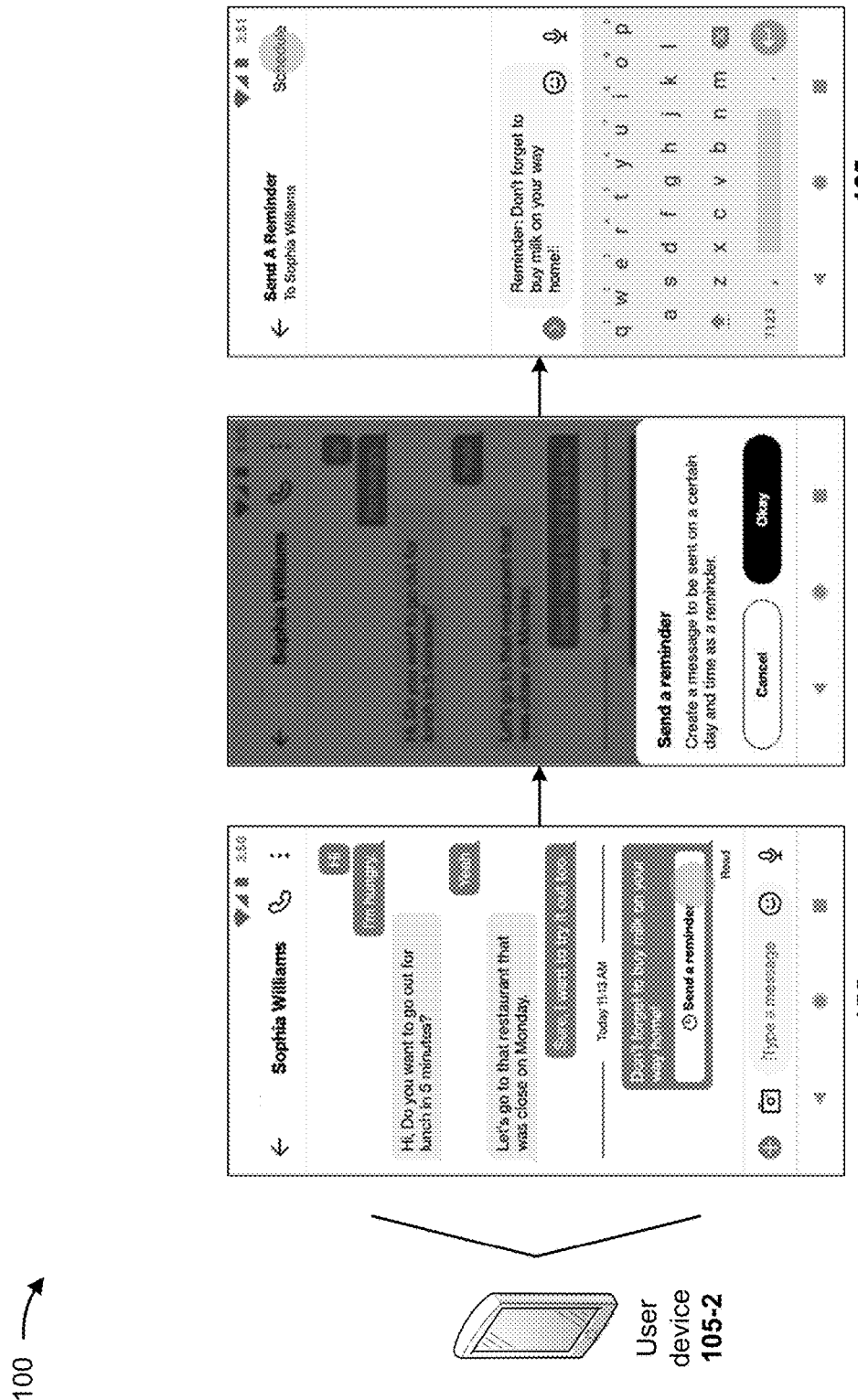

As described in connection with FIGS. 1A-1D, there may be different methods for setting a reminder from a received text message. Some methods may involve setting a reminder from a text message that is being sent. Some reminders may be scheduled for a future text message. FIG. 1E shows a method for setting up, from a text message, a reminder to be sent for an event. As shown by reference number 155, the user device 105-2 may receive a selection of an option to send the reminder in a text message. As shown by reference number 160, the user device 105-2 may receive a selection of an option to create a text message to be sent as a reminder. As shown by reference number 165, the user device 105-2 may automatically populate the reminder with text of the text message, and schedule when the reminder is to be sent. The reminder may be sent for a particular event.

In some implementations, to set a reminder, the user device 105-2 may schedule a reminder task that is stored in an application or service database with an associated date and time. When the date and time associated with the stored reminder arrives, a task server may use a push notification server to transmit a reminder based on the stored reminder task. The reminder may be pushed out as a text message (e.g., short message service (SMS) or multimedia messaging service (MMS)) or via another cross-platform application service. In this way, the user device 105-2 may set reminders that may be transmitted via text message to other users, including to the user device 105-2 itself.

Figure 1F:
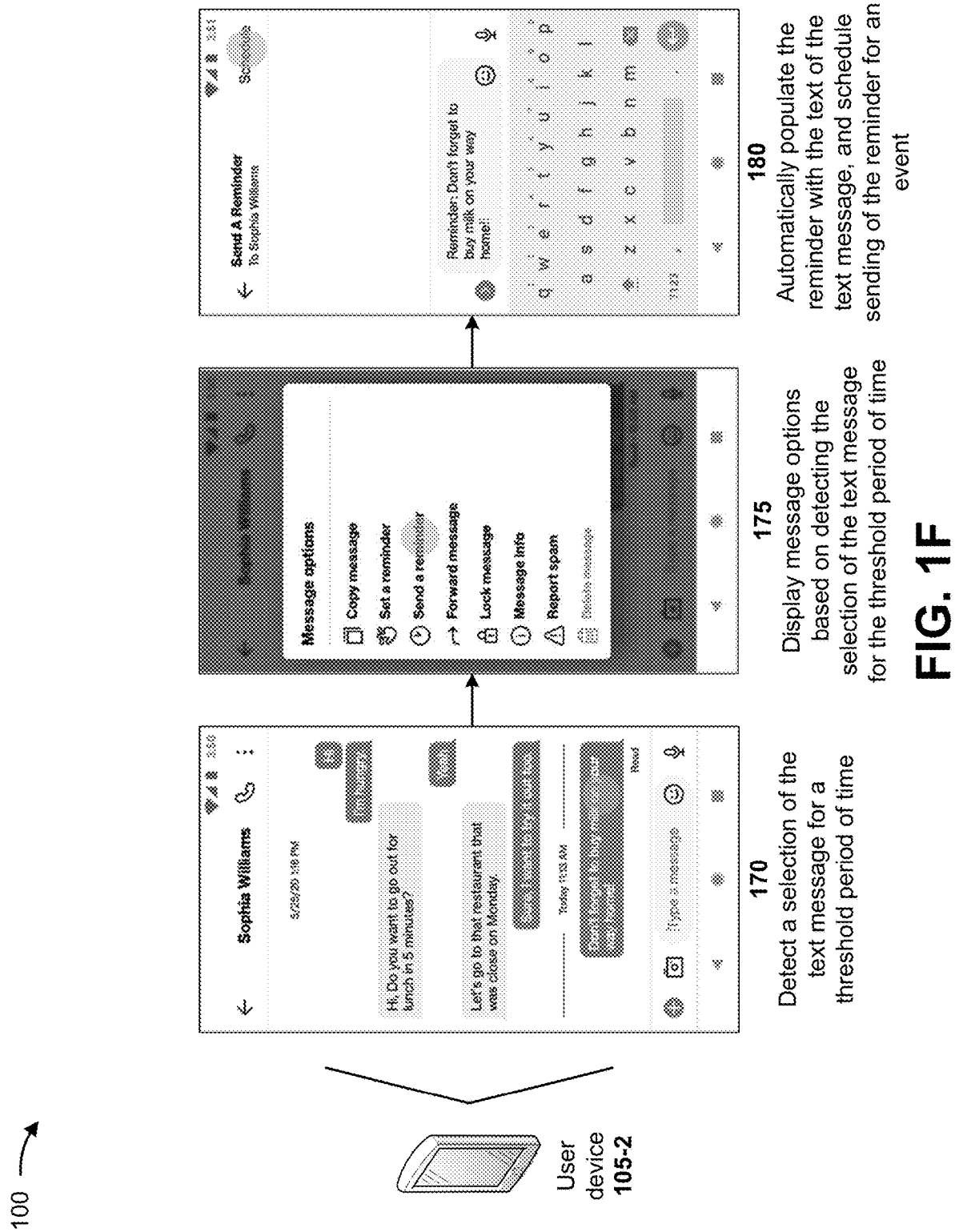

The user device 105-2 may schedule a reminder to be sent due to a sustained pressing of a text message, similar to the method described above in connection with FIG. 1D. As shown by FIG. 1F, and by reference number 170, the user device 105-2 may detection a selection of the text message for a threshold period of time. As shown by reference number 175, the user device 105-2 may display message options based on the selection satisfying a threshold period of time. As shown by reference number 180, the user device 105-2 may automatically populate the reminder and schedule the reminder to be sent for an event. The reminder may be associated with the event such that if the event changes, the reminder may also change.

The user device 105-2 may set up a text message to be sent from a reminder setup screen. As shown by FIG. 1G, and by reference number 185, the user device 105-2 may receive a selection of an option to send a reminder. The option may be presented in a text message conversation, a web page, or in a specific application. As shown by reference number 190, the user device 105-2 may receive an identification of a recipient of the new reminder. The recipient may be a contact or may be the user of the user device 105-2. As shown by reference number 195, the user device 105-2 may receive text for the reminder and may schedule when the reminder is to be sent or a trigger for the reminder. The reminder may be sent for an event. In some implementations, the user device 105-2 may enable the user to cancel the reminder or edit the reminder, such as by changing a reminder time, reminder recipient, or reminder content.

In some implementations, the reminders may be searched for, edited, or deleted. When editing a reminder, options for sending the reminder may be selected. The user device 105-2 may also present more customization options for sending a reminder. Reminders may be marked as completed, even from a text message conversation. In some implementations, reminders may be snoozed or delayed for a time period.

In some implementations, when a reminder is scheduled for a group event, other group members may receive a notification of the reminder being scheduled. Other members of the groups may receive the notification (e.g., via text message) and edit or suggest an edit to the reminder. For example, if a recipient of the notification (via text message) has a schedule conflict, the user device of the recipient may detect the schedule conflict and provide a prompt to edit the reminder from the notification text message. In some implementations, the user device 105-2 may detect a group conflict from keywords in text messages from members of the group and provide a prompt to edit the reminder in one of these text messages. The reminder may then be modified. The author of the reminder may receive a simple text message prompting the author to edit the reminder based on a detection of the conflict. The user device 105-2 may also prompt the user to edit the reminder if changes are made in a calendar application or other related application.

By setting a reminder directly from a text message, a user may more conveniently set reminders while involved in a text conversation. A user device may conserve power, processing resources, and signaling resources as a result of efficient reminder setting from a text message.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
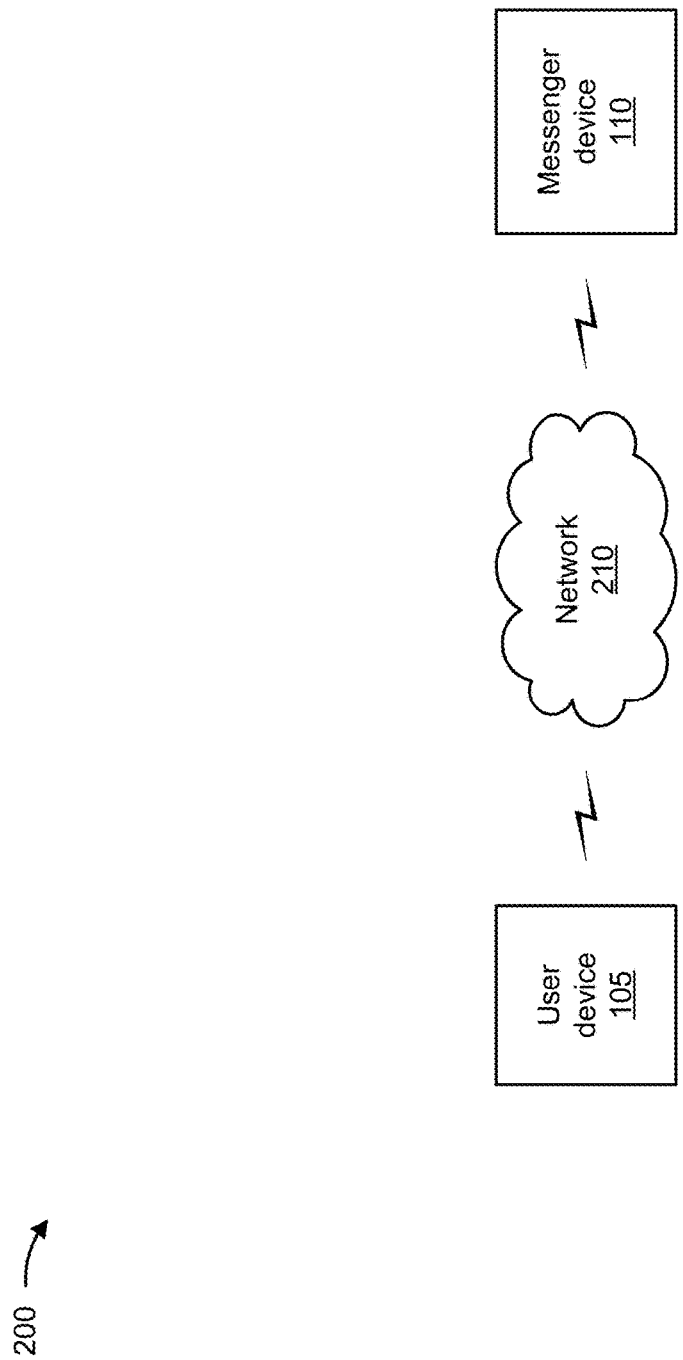
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 105, a network 210, and a messenger device 110. Devices of environment 200 may interconnect via wired connections, wireless connections, or a combination of wired and wireless connections.

The user device 105 includes one or more devices capable of receiving, generating, storing, processing, and/or providing information associated with sending or receiving a text message that can be saved as a reminder, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 105 may use push notifications, including via firebased cloud messaging (FCM) or vendor-specific push notification. The user device 105 may also set reminders using a representational state transfer (REST) application protocol interface (API).

The network 210 includes one or more wired and/or wireless networks. For example, the network 210 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 210 enables communication among the devices of environment 200.

The messenger device 110 includes one or more devices capable of receiving, generating, storing, processing, providing, and/or routing information associated with sending or receiving a text message that can be saved as a reminder, as described elsewhere herein. The messenger device 110 may include a communication device and/or a computing device. For example, the messenger device 110 may include a server, such as an application server, a client server, a web server, core network entity, radio access network entity, a database server, a host server, a proxy server, a virtual server (e.g., executing on computing hardware), or a server in a cloud computing system. In some implementations, the messenger device 110 includes computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
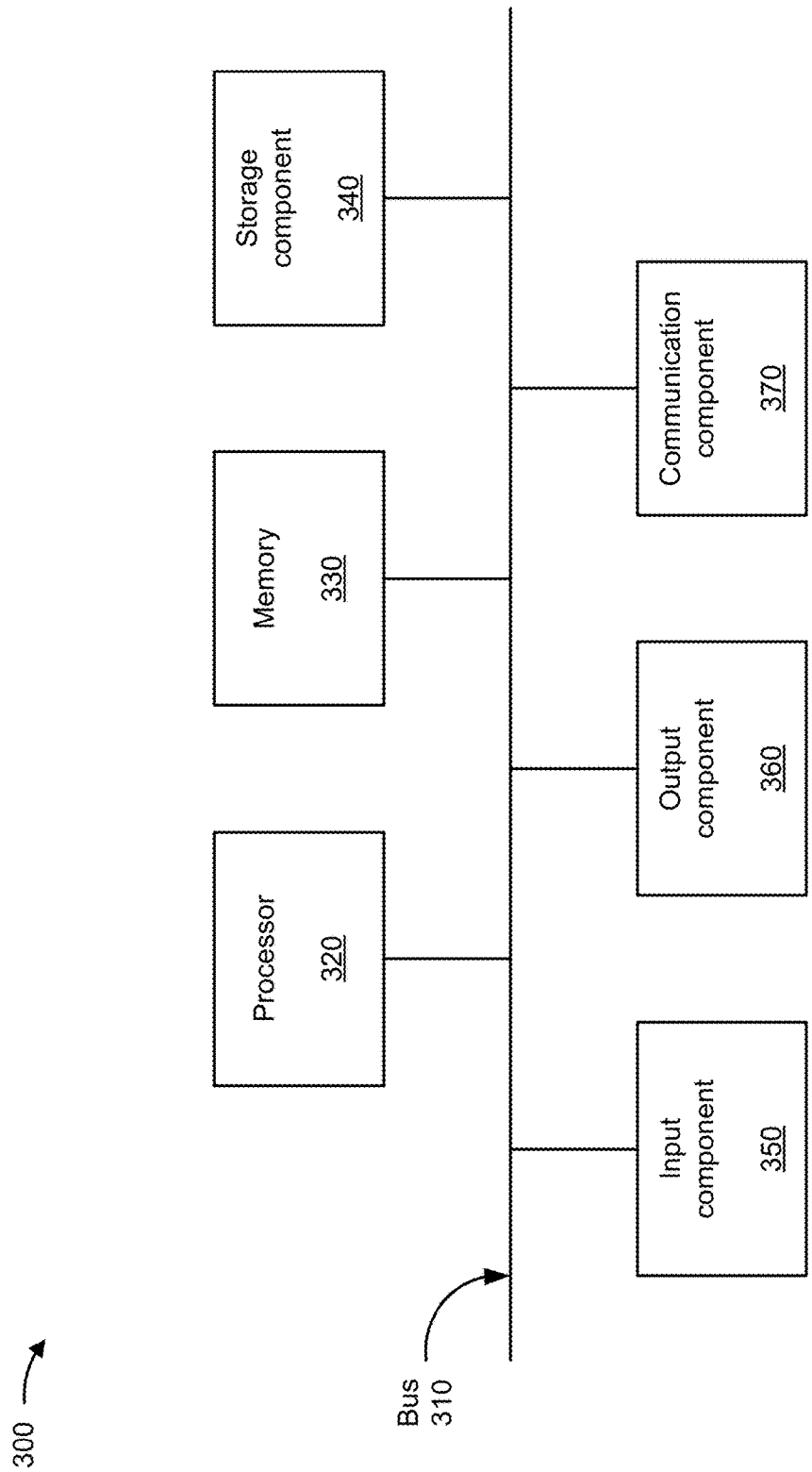
FIG. 3 is a diagram of example components of one or more devices of FIG. 2.

FIG. 3 is a diagram of example components of a device 300, which may correspond to user device 105. In some implementations, user device 105 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with sending and receiving a text message to be saved as a reminder. In some implementations, one or more process blocks of FIG. 4 may be performed by a user device (e.g., user device 105). In some implementations, one or more process blocks of FIG. 4 may be performed by another device or a group of devices separate from or including the user device, such as messenger device 110. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a text message (block 405). For example, the user device may receive a text message, as described above. In some implementations, the text message may be a lone text message or part of a text message conversation.

As further shown in FIG. 4, process 400 may include identifying a keyword in the text message (block 410). For example, the user device may identify a keyword in text of the text message related to an event, as described above. In some implementations, the keyword relates to an event that is ongoing or occurring at a future time. The user device may identify the keyword from stored keywords and/or a lookup table.

As further shown in FIG. 4, process 400 may include generating, based on identifying the keyword, a first user interface that includes an option to set a reminder (block 415). For example, the user device may generate, based on identifying the keyword, a first user interface that includes the text message and an option to set a reminder, as described above. As further shown in FIG. 4, process 400 may include displaying the first user interface (block 420). For example, the user device may display the first user interface, as described above.

As further shown in FIG. 4, process 400 may include receiving a first selection of the option from the first user interface (block 425). For example, the user device may receive a first selection of the option from the first user interface, as described above. As further shown in FIG. 4, process 400 may include generating, based on the first selection, a second user interface (block 430). For example, the user device may generate, based on the first selection, a second user interface that includes different reminder types, as described above. As further shown in FIG. 4, process 400 may include displaying the second user interface (block 435). For example, the user device may display the second user interface, as described above.

As further shown in FIG. 4, process 400 may include receiving a second selection of a reminder type from among different reminder types from the second user interface (block 440). For example, the user device may receive a second selection of a reminder type from among different reminder types from the second user interface, as described above.

As further shown in FIG. 4, process 400 may include populating, automatically by the user device, the reminder with the text of the text message based on the second selection (block 445). For example, the user device may populate, automatically by the user device, the reminder with the text of the text message based on the second selection, as described above. The text may include an event name, event date, event time, event location, and/or an event contact person. The user device may also automatically populate a calendar based on information from the text message.

As further shown in FIG. 4, process 400 may include storing the reminder (block 450). For example, the user device may store the reminder, as described above. In some implementations, the reminder may be stored on the user device. In some implementations, the reminder may be stored in a tasks server, from which a reminder may be sent by a text message.

As further shown in FIG. 4, process 400 may include causing an action to be performed based on the reminder (block 455). For example, the user device may cause an action to be performed based on the reminder, as described above. In some implementations, an action may include populating a calendar that includes information relating to the text message. This may cause a reminder, relating to the text message, to be set in a reminder application on the user device. The reminder may be displayed at the future time or based on a location of the user device. The reminder may also cause a second text message to be transmitted to the user device at the future time with information relating to the text message. For example, the user device may automatically transmit the second text message at or near the future time, or cause a reminder or messaging service to transmit the second text message. When the future event occurs, the user device may display a third user interface that includes the reminder.

In some implementations, process 400 includes receiving another text message and detecting a third selection of the other text message for a threshold period of time. The user may display message options on a third user interface, based on detecting the third selection of the other text message for the threshold period of time. The user device may receive a fourth selection of a set reminder option from the message options of the third user interface and automatically populate another reminder with text of the other text message based on the fourth selection. The user device may store the other reminder and then display the other text message. The user device may display the other reminder in a fourth user interface when the event occurs. When the event occurs, the user device may display a third user interface that includes the reminder and a snooze or delay option. The user device may receive a selection for the snooze or delay option.

In some implementations, process 400 includes generating another option to send another reminder based on the text message and displaying a third user interface that includes the text message and the other option to send the other reminder. The user device may receive a third selection of the other option from the third user interface and automatically populate the other reminder with the text of the text message based on the third selection. The other reminder may be stored.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a user device, a text message;
   identifying, by the user device, a keyword in the text message that relates to an event,
      wherein identifying the keyword is based on developing keyword information based on a history of words associated with reminder actions,
      wherein a particular keyword is removed from the keyword information based on a number of instances where no action is taken;
   generating, by the user device and based on identifying the keyword, a first user interface that includes an option to set a reminder;
   displaying, by the user device, the first user interface;
   receiving, by the user device, a first selection of the option from the first user interface;
   populating, automatically by the user device, the reminder with text from the text message based on the first selection,
      wherein populating the reminder comprises:
         populating the reminder using contact information associated with a sender associated with the text message;
   causing, by the user device, an action to be performed based on the reminder;
   determining, by the user device, a schedule conflict associated with the event based on detecting a second keyword in a group text message; and
   causing, by the user device, another action to be performed based on determining the schedule conflict,
      wherein the other action comprises providing a prompt to edit the reminder,
         wherein the prompt is provided from a notification text message based on detecting the schedule conflict.

2. The method of claim 1, wherein causing the action to be performed comprises one of:
   populating a calendar that includes information relating to the text message;
   causing the reminder, relating to the text message, to be set in a reminder application on the user device; or
   causing a second text message to be transmitted to the user device at a future time with the information relating to the text message.

3. The method of claim 1, further comprising:
   generating, when the event occurs, a second user interface that includes the reminder; and
   displaying the second user interface.

4. The method of claim 1, further comprising:
   receiving another text message;
   detecting a second selection of the other text message for a threshold period of time;
   generating a second user interface that includes message options, based on detecting the second selection of the other text message for the threshold period of time;
   displaying the second user interface;
   receiving a third selection of a set reminder option from the message options of the second user interface;
   populating, automatically, another reminder with text of the other text message based on the third selection;
   storing the other reminder;
   displaying the other text message after storing the other reminder; and
   generating, when the event occurs, a third user interface that includes the other reminder; and
   displaying the third user interface.

5. The method of claim 1, further comprising:
   generating, by the user device based on the first selection, a second user interface;
   displaying, by the user device, the second user interface; and
   receiving, by the user device, a second selection of a reminder type from a plurality of different reminder types; and wherein automatically populating the reminder includes populating a reminder of the reminder type.

6. The method of claim 1, further comprising:
generating, when the event occurs, a second user interface that includes the reminder and a delay option;
displaying the second user interface;
receiving a second selection of the delay option of the second user interface; and
displaying the first user interface after receiving the second selection.

7. The method of claim 1, further comprising:
generating another option to send another reminder based on the text message;
generating a second user interface that includes the text message and the other option to send the other reminder;
displaying the second user interface;
receiving a second selection of the other option from the second user interface;
populating, automatically, the other reminder with the text of the text message based on the second selection; and
storing the other reminder.

8. A user device, comprising:
one or more processors configured to:
receive a text message;
identify a keyword in the text message,
wherein the one or more processors, to identify the keyword, are configured to identify the keyword based on developing keyword information based on a history of words associated with reminder actions,
wherein a particular keyword is removed from the keyword
information based on a number of instances where no action is taken;
generate a first option to set a reminder based on identifying the keyword;
generate a first user interface that includes the first option to set the reminder;
display the first user interface;
receive a first selection of the first option from the first user interface;
generate, based on the first selection, a second user interface;
display the second user interface;
receive a second selection of a reminder type from among a plurality of different reminder types from the second user interface;
populate, automatically by the user device, the reminder with text of the text message based on the second selection,
wherein the one or more processors, to populate the reminder, are configured to:
populate the reminder using contact information associated with a sender associated with the text message;
store the reminder;
generate, when an event occurs, a third user interface that includes the reminder;
display the third user interface;
determine a schedule conflict associated with the event based on detecting another keyword in a group text message; and
cause another action to be performed based on determining the schedule conflict,
wherein the other action comprises providing a prompt to edit the reminder,
wherein the prompt is provided from a notification text message based on detecting the schedule conflict.

9. The user device of claim 8, wherein the one or more processors are further configured to:
generate a second option to send another reminder based on the text message;
generate a fourth user interface that includes the text message and the second option to send the other reminder;
display the fourth user interface;
receive a third selection of the second option from the fourth user interface;
populate, automatically, the other reminder with text of the text message based on the third selection;
store the other reminder; and
provide, when the event occurs, the other reminder to another user device associated with the text message.

10. The user device of claim 8, wherein the one or more processors are further configured to:
receive another text message;
detect a third selection of the other text message for a threshold period of time;
generate a fourth user interface that includes message options, based on detecting the third selection of the other text message for the threshold period of time;
display the fourth user interface;
receive a fourth selection of a send reminder option from the message options of the fourth user interface;
populate, automatically, another reminder with text of the other text message based on the fourth selection; and
store the other reminder.

11. The user device of claim 10, wherein the one or more processors are further configured to:
provide, when an event occurs, the other reminder to another user device associated with the other text message.

12. The user device of claim 8, wherein the one or more processors are further configured to:
generate a fourth user interface that includes another option to send a new reminder;
display the fourth user interface;
receive an identification of a recipient of the new reminder via the fourth user interface;
receive text for the new reminder via the fourth user interface;
receive a time associated with transmitting the new reminder via the fourth user interface; and
store the new reminder.

13. The user device of claim 12, wherein the one or more processors are further configured to:
transmit, automatically when the time occurs, the new reminder to another user device associated with the recipient.

14. The user device of claim 8, wherein the one or more processors are further configured to:
receive a modification to the reminder;
modify the reminder, based on the modification, to generate a modified reminder; and
store the modified reminder.

15. A non-transitory computer-readable medium storing a set of instructions, the set of instructions comprising:
one or more instructions that, when executed by one or more processors of a user device, cause the user device to:
receive a text message;

identify a keyword in the text message that relates to an event,
    wherein the one or more instructions, that cause the one or more processors to identify the keyword, cause the one or more processors to identify the keyword based on developing keyword information based on a history of words associated with reminder actions,
        wherein a particular keyword is removed from the keyword information based on a number of instances where no action is taken;
generate an option to a set a reminder based on identifying the keyword;
generate a first user interface that includes the text message and the option to set the reminder;
display the first user interface;
receive a first selection of the option from the first user interface;
populate, automatically by the user device, the reminder based on the first selection,
    wherein the one or more instructions, that cause the user device to populate the reminder, cause the user device to:
        populate the reminder using contact information associated with a sender associated with the text message;
store the reminder;
generate, when the event occurs, a second user interface that includes the reminder;
display the second user interface;
determine a schedule conflict associated with the event based on detecting another keyword in a group text message; and
cause another action to be performed based on determining the schedule conflict,
    wherein the other action comprises providing a prompt to edit the reminder,
        wherein the prompt is provided from a notification text message based on detecting the schedule conflict.

16. The non-transitory computer-readable medium of claim 15, wherein the one or more instructions further cause the user device to:
receive another text message;
detect a second selection of the other text message for a threshold period of time;
generate a third user interface that includes message options, based on detecting the second selection of the other text message for the threshold period of time;
display the third user interface;
receive a third selection of a set reminder option from the message options of the third user interface;
populate, automatically, another reminder with text of the other text message based on the third selection;
store the other reminder;
generate, when the event occurs, a fourth user interface that includes the other reminder; and
display the fourth user interface.

17. The non-transitory computer-readable medium of claim 15, wherein the one or more instructions further cause the user device to:
generate, when the event occurs, a third user interface that includes the reminder and a delay option;
display the third user interface;
receive a second selection of the delay option of the third user interface; and
display the first user interface after receiving the second selection.

18. The non-transitory computer-readable medium of claim 15, wherein the one or more instructions further cause the user device to:
generate another option to send another reminder based on the text message;
generate a third user interface that includes the text message and the other option to send the other reminder;
display the third user interface;
receive a second selection of the other option from the third user interface;
populate, automatically, the other reminder with text of the text message based on the second selection; and
provide, when the event occurs, the other reminder to another user device associated with the text message.

19. The non-transitory computer-readable medium of claim 15, wherein the one or more instructions further cause the user device to:
receive another text message;
detect a second selection of the other text message for a threshold period of time;
generate a third user interface that includes message options, based on detecting the second selection of the other text message for the threshold period of time;
display the third user interface;
receive a third selection of a send reminder option from the message options of the third user interface;
populate, automatically, another reminder with text of the other text message based on the third selection;
store the other reminder; and
provide, when the event occurs, the other reminder to another user device associated with the other text message.

20. The non-transitory computer-readable medium of claim 15, wherein the one or more instructions further cause the user device to:
generate a third user interface that includes another option to send a new reminder;
display the third user interface;
receive an identification of a recipient of the new reminder via the third user interface;
receive text for the new reminder via the third user interface;
receive a time associated with transmitting the new reminder via the third user interface;
store the new reminder; and
transmit, automatically when the time occurs, the new reminder to another user device associated with the recipient.

\* \* \* \* \*